Oct. 31, 1967

C. W. FINKL 3,349,615

MARINE SPEED INDICATORS

Filed Oct. 30, 1964

INVENTOR.
Charles W. Finkl,
BY Parker & Carter
Attorneys.

United States Patent Office 3,349,615
Patented Oct. 31, 1967

3,349,615
MARINE SPEED INDICATORS
Charles W. Finkl, 2011 Southport Ave.,
Evanston, Ill. 60614
Filed Oct. 30, 1964, Ser. No. 407,670
5 Claims. (Cl. 73—182)

ABSTRACT OF THE DISCLOSURE

A device for measuring speed of vessel using a Pitot tube and a static tube coupled to a pressure differential diaphragm. A source of pressurized gas is used to provide a gas pressure in the tubes which is greater than the static and total pressure so that the tubes are maintained free of water.

---

My invention is in the field of speed indicators of the type having a Pitot-static tube and a pressure differential indicating device connected thereto. The invention is more particularly concerned with such a device that can be utilized on vessels such as motorboats and sailboats for measuring realtively low rates of speed, relative to the water.

A primary object of my invention is a speed indicating device for a vessel that will accurately measure low rates of speed of the vessel relative to the water, yet will also accurately measure all rates of speed.

Another object is a speed indicating mechanism that will rapidly indicate changes in the speed of the vessel.

Another object is a speed indicating mechanism that is not susceptible to corrosion damage and clogging.

Another object is a speed indicating mechanism that can be easily installed on every type of vessel.

Other objects will appear from time to time in the ensuing specification and drawings, in which.

Figure 1:
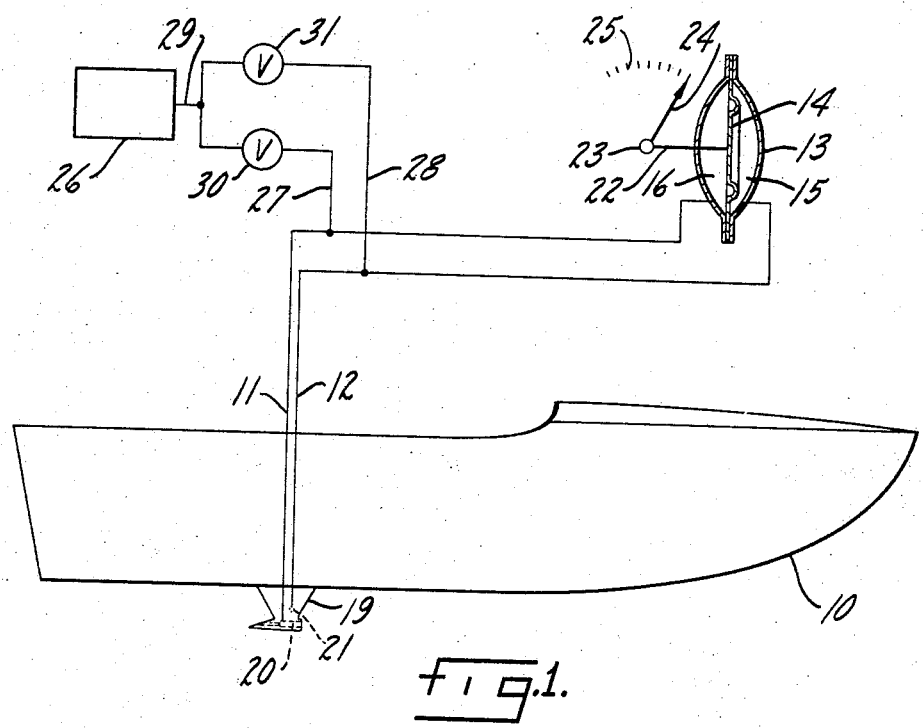
FIGURE 1 is a schematic drawing showing the speed indicator installed in a small boat.

The speed indicating mechanism of this invention is intended for installation on a vessel such as the boat hull designated as 10 in FIGURE 1. The speed indicating mechanism includes a Pitot tube 11 and a static tube 12 having outlet ends which are connected to a housing 13 divided by diaphragm 14 into chambers 15 and 16. The Pitot tube is connected to one chamber of the housing, in this case 16, and the static tube is connected to the other chamber 15 on the opposite side of the diaphragm. The opposite or inlet ends of the tubes 11 and 12 are positioned in the water supporting the vessel. In this case, as in the usual installation, the housing 13 is located in the vessel and the tubes extend through an opening 17 in the hull 18 of the vessel into the water. In order to provide rigidity for the tubes and to protect them against contact with objects in the water, they are extended through a fin 19, which is attached to the hull 18. The fin is streamlined to reduce turbulence and drag as the vessel moves through the water. The ends of the Pitot and static tubes 11 and 12 which extend into the water terminate, respectively, in openings 20 and 21, with the opening 20 facing in the direction of movement of the vessel and the opening 21 facing transversely of the direction of movement of the vessel. These openings are located approximately the same distance below the vessel hull 18 so that they will be subjected to the same static water pressure.

The diaphragm 14 is connected by levers and gears, herein indicated by line 22 and circle 23 to a pointer 24 which can move across the face of a dial 25. The dial 25 is calibrated either in pounds per square inch or, more conveniently, miles per hour. Any difference between the pressure in the Pitot tube 11 and the pressure in the static tube 12 will displace the diaphragm and the pointer 24. Since the purpose of this mechanism is to indicate rate of movement or speed of the vessel relative to the water, which movement will be indicated by an increase in pressure in the Pitot tube, the dial and pointer are arranged to indicate movement of the diaphragm due to higher pressure in the Pitot tube than in the static tube.

In one of the novel aspects of the present invention, gas is utilized to maintain the tubes relatively free of water and to provide a pressure transfer medium that will react quickly to changes in the water pressure exerted at the Pitot and static tube inlets. The gas is obtained from a source 26 and delivered to the Pitot tube 11 and static tube 12 through conduits 27, 28 and 29. The conduit 29 connects the source 26 of gas with the conduits 27 and 28, which in turn are connected to the tubes 11 and 12 intermediate the inlets 20 and 21 and the chambers 15 and 16 of the pressure differential indicating device. Throttling valves 30 and 31 are provided in the conduits 27 and 28 for the purpose of individually controlling the volume and pressure of gas flowing into the Pitot tube and the static tube from the source 26.

The pressurized gas can be obtained from any source 26 having a pressure greater than the maximum pressure that will occur in the Pitot tube 11 at the highest speed of the vessel. The source of pressurized gas can be a miniature low volume air compressor, a hand pump and reservoir, or a Freon bottle such as is used in marine horns. The volume required is only enough to keep a bubble occasionally emitting from the Pitot and static tube outlets, and to satisfy the volume changes in the Pitot tube caused by changes in the vessel's speed.

Figure 2:
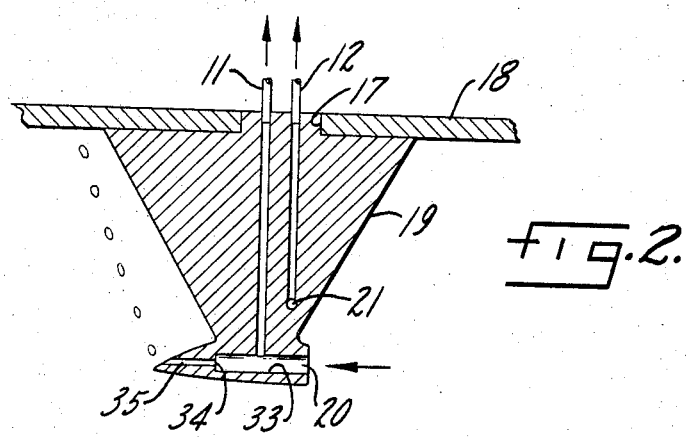
FIGURE 2 is an enlarged side elevational view in half section of the Pitot-static tube head of FIGURE 1.

In another aspect of the invention, the inlet of the Pitot tube 11 is arranged in a novel manner to permit the escape of bubbles of gas from the Pitot tube, yet at the same time retain in the Pitot tube the velocity pressure built up by the movement of the vessel through the water. This is acomplished, as shown in FIGURE 2, by positioning the velocity opening 20 at the forward end of a tube 33, the mid point of which is connected to the Pitot tube so as to extend at right angles thereto. At the opposite or rearward end of the tube 33 a smaller exit opening 34 is provided, which leads into a tube 35 and into the water. With this arrangement, the gas bubbles can escape from the Pitot tube 11 even as the vessel moves through the water. While there is some loss of velocity pressure due to the flow of water through the opening 34 and tube 35, the small size of this outlet relative to the opening 20 reduces the amount of loss and error in the velocity reading to a minimum.

The use, operation and function of my invention are as follows:

Some of the serious objections to the use of a Pitotstatic tube speed indicator in small vessels have been the inaccuracy of this device at relatively low speeds and the inability of the indicator to react to rapid changes in speed. These failings are due to the device being dependent upon fluctuations in the water levels in the tubes 11 and 12, to change the pressures in these tubes and thereby operate the diaphragm 14 and the indicator 24. When the vessel is in the water, there is a normal water level in tubes 11 and 12 due to the static head of water above the openings 20 and 21. These columns of water are normally the same height when the vessel is not moving in the water and therefore the pressures in chambers 15 and 16 on opposite sides of the diaphragm 14 will be the same. Consequently, no reading will be indicated on the pointer 24 and dial 25. As the vessel moves through the water, the velocity pressure will increase at opening 20 raising the height of water in the Pitot tube 11. This increase in the volume of water in the Pitot tube will compress the air in the tube and chamber 16 to move the diaphragm and dial indicator 24. As the speed of the vessel changes, the height of the column of water in tube 11 will also fluctuate, but due to the small size of the tube and opening 20 the height of the column will not change as rapidly as the changes in speed of the boat, thus resulting in errors in the speed reading.

Additionally, the introduction of water into the tubes 11 and 12 is objectionable, because of corrosion and clogging of these tubes. This is especially true where the vessel is operated in salt water.

The utilization of gas under pressure to fill the tubes 11 and 12 provides a medium that will accurately and rapidly react to changes in pressure exerted against the inlets 20 and 21 of the Pitot and static tubes due to changes in the velocity and static pressures of the water. This gas medium will also be sensitive even to the small pressures generated at low speeds. The key to use of gas as a pressure medium in the tubes resides in maintaining the gas pressure in each tube at a pressure substantially equal to the water pressure acting on that tube inlet. Thus, the pressure in the Pitot tube must be automatically varied as the speed of the vessel changes, and the pressure in the static tube must be maintained constant as long as the water level remains constant.

These results are obtained in the present invention by providing a source 26 of gas of higher pressure than the maximum pressure expected to be exerted by the water against the Pitot tube inlet, and by providing separate throttling valves for controlling the volume and pressure of gas admitted into the Pitot tube 11 and the static tube 12. Successful operation of the speed measuring device is also achieved by the method of adjusting the gas pressures in the tubes and rate of flow of gas into these tubes. When the vessel is at rest in the water, the pressures and water levels in the tubes 11 and 12 will be equal because there will be no velocity pressure operating against the tube 11. Therefore, if pressures slightly greater than the pressure due to the static head of the water are introduced into the tubes 11 and 12, the water will be forced out of the tubes. If the valves 30 and 31 are adjusted to permit a flow of gas into the tubes so that the gas pressure is sufficient to keep the water out and the volume is sufficient so that a small amount of gas escapes through the inlets 20 and 21, then the pressure in these tubes will be maintained slightly higher than the static pressure of the water. The escape of gas from the tubes will be indicated by bubbles coming out of the inlets. Because the pressure is the same in both tubes, the diaphragm 14 will not move and the pointer 24 will indicate zero velocity.

As the vessel moves through the water, additional pressure will be exerted on the inlet 20 due to the velocity pressure of the water, and the water will rise momentarily in the Pitot tube 11. As the water rises in the Pitot tube, it will momentarily stop the escape of gas through the inlet 20, thus increasing the pressure in the tube and in the housing 16 to cause movement of the diaphragm 14 and the pointer 24. With the escape of gas from the inlet prevented by the column of water, the gas entering the tube 11 through the valve 30 will collect in this tube until it builds up to a pressure sufficient to force the water out of the tube. When the gas reaches this pressure, the bubbles will again escape through the inlet 20 of the Pitot tube to thereby maintain a pressure in the Pitot tube slightly higher than the combined velocity and static head of the water. Thus, by using a source of gas under a pressure higher than the pressure to be exerted against the Pitot tube inlet, and a separate throttling valve for the Pitot tube and the static tube, the pressure will automatically build up to whatever pressure is created in the Pitot tube by the velocity pressure of the water without further adjustment of the valve. The gas pressure will not increase beyond the pressure exerted by the water because of the provision made for the escape of gas from the Pitot tube.

The escape of bubbles and consequently the flow of gas through the Pitot tube during movement of the vessel through the water is facilitated by the construction of the inlet 20 of the Pitot tube shown in this application. This construction provides a rearwardly opening exit 35 through which the bubbles can escape, even as water enters the forward portion of the tube 33 during movement of the vessel through the water. With this design, the exit of the bubbles into the water is aided by the movement of water through the tube 33. The use of a smaller rear exit 35 permits the escape of the bubble, yet permits the velocity pressure to build up in the tube 33 so as to act against the inlet 20 of the Pitot tube.

When the speed indicating mechanism of this invention is used on flat bottom boats of relatively shallow draft, the construction can be simplified by the elimination of the static tube 12. The static tube can be eliminated in shallow draft boats without affecting the accuracy of the speed indicating mechanism because the static pressure due to the height of water above the opening 20 of the Pitot tube 11 is small enough to be disregarded. When the static tube is eliminated, the pressure indicating mechanism 13 is modified by venting the static chamber 15 to the atmosphere rather than to the static tube. The method of introducing gas into the Pitot tube is not changed. As in the other construction, the valve 27 is open sufficiently to allow enough gas into the Pitot tube to keep the water out while permitting an occasional bubble of gas to escape. This flow of gas is maintained as the speed of the vessel through the water changes. Thus, as in the other construction, the gas pressure in the Pitot tube changes as the water velocity pressure changes to indicate the speed of the vessel.

I claim:
1. A speed indicator for a vessel including a Pitot tube and a static tube, each tube having an inlet at one end adapted to be inserted in the water supporting the vessel, a housing connected to the opposite ends of the tubes and having a flexible wall located therein separating said ends of said tubes, a pointer operatively connected to said flexible wall to move upon movement of the wall, a scale indicating speed associated with said pointer, a source of gas under pressure connected to the tubes intermediate said inlets and said housing, the pressure of said source of gas being greater than the maximum water pressure in said tubes, and means to individually control the rate of flow of gas from said source into each tube to maintain said tubes substantially free of water.

2. The structure of claim 1 further characterized in that said Pitot tube inlet terminates in a chamber having a first opening facing in the direction of travel of said vessel and a second a smaller opening facing in the opposite direction from said first opening.

3. A speed indicator for a vessel, including a Pitot tube and a static tube, each tube having an inlet at one end adapted to be positioned in the water supporting the vessel, a speed indicating means connected to the opposite ends of the tubes, a source of gas under pressure, means to connect said source of gas to each of said tubes with each connection being located intermediate said inlet and said speed indicating means, means to regulate the flow of gas from said source into said Pitot tube to maintain a pressure in said tube at all times slightly greater than the pressure due to the velocity and static heads of water at said tube inlet when the vessel is moving through the water to maintain said tubes substantially free of water.

4. A speed indicator for a vessel, said indicator including
 a Pitot tube and a static tube
  each of said tubes having an inlet adapted to be positioned at substantially the same level in the water supporting the vessel to thereby maintain substantially uniform pressures in the tubes at zero relative velocity, means for detecting a pressure difference between the two tubes and indicating a speed proportional to the amount of pressure difference, means for creating a gaseous pressure in said static tube just slightly greater than the water head pressure at zero velocity to maintain said tube substantially free to water, and means for generating a gaseous pressure in the Pitot tube just slightly greater than the water head pressure corresponding to a given relative velocity between the vessel and the water at any instant to maintain said tube substantially free of water, said means for generating the gaseous pressure in the Pitot tube functioning independently of the means for creating a gaseous pressure in the static tube to thereby establish a gaseous pressure differential corresponding to the water head which is measurable by the pressure difference detecting and speed indicating means.

5. A speed indicator for a vessel including a Pitot tube having an inlet at one end adapted to be inserted in the water supporting the vessel, a pressure detecting and speed indicating means connected to the opposite end of said Pitot tube, a source of gas under pressure connected to the Pitot tube intermediate the inlet and the pressure detecting and speed indicating means, the pressure of said source of gas being greater than the maximum water pressure in the Pitot tube, and means to control the rate of flow of gas from the source into the Pitot tube to maintain said tube substantially free of water.

References Cited

UNITED STATES PATENTS

| 1,692,163 | 11/1928 | Farman | 73—302 |
| 2,573,515 | 10/1951 | Urfer | 73—182 |
| 2,749,749 | 6/1956 | Billman et at. | 73—182 |
| 3,050,996 | 8/1962 | Henderson | 73—182 |
| 3,088,314 | 4/1963 | Gardner et al. | 73—182 |
| 3,126,739 | 3/1964 | Whitehill | 73—182 |
| 3,149,491 | 9/1964 | Sissenwine et al. | 73—182 |

OTHER REFERENCES

Ser. No. 362,231, C. H. H. Rodanet (A.P.C.), published May 9, 1943.

LOUIS R. PRINCE, *Primary Examiner.*

DAVID SCHONBERG, *Examiner.*

NEIL B. SIEGEL, *Assistant Examiner.*